US010245681B2

(12) United States Patent
 Koerber

(10) Patent No.: US 10,245,681 B2
(45) Date of Patent: Apr. 2, 2019

(54) GENERATING A THREE-DIMENSIONAL COMPONENT BY SELECTIVE LASER MELTING

(71) Applicant: TRUMPF GmbH + Co. KG, Ditzingen (DE)

(72) Inventor: Christian Koerber, Asperg (DE)

(73) Assignee: TRUMPF GmbH + Co. KG, Ditzingen (DE)

( * ) Notice: Subject to any disclaimer, the term of this patent is extended or adjusted under 35 U.S.C. 154(b) by 656 days.

(21) Appl. No.: 14/979,855

(22) Filed: Dec. 28, 2015

(65) Prior Publication Data

US 2016/0107263 A1    Apr. 21, 2016

Related U.S. Application Data

(63) Continuation of application No. PCT/EP2014/001771, filed on Jun. 27, 2014.

(30) Foreign Application Priority Data

Jun. 28, 2013    (DE) .................. 10 2013 212 620

(51) Int. Cl.
 *B23K 26/342*    (2014.01)
 *B22F 3/105*    (2006.01)
 (Continued)

(52) U.S. Cl.
 CPC .......... *B23K 26/342* (2015.10); *B22F 3/1055* (2013.01); *B22F 5/10* (2013.01);
 (Continued)

(58) Field of Classification Search
 CPC ..... B23K 26/342; B22F 3/1055; B22F 3/1056
 See application file for complete search history.

(56) References Cited

U.S. PATENT DOCUMENTS 7,810,237 B2    10/2010    Lange et al.
8,073,315 B2    12/2011    Philippi
(Continued)

FOREIGN PATENT DOCUMENTS

CA    2560181 A1    9/2005
CA    2825648 A1    8/2012
(Continued)

OTHER PUBLICATIONS

Vaezi et al., "A review on 3D micro-additive manufacturing technologies", Int J Adv Manuf Technol 67: 1721-1754, Published Nov. 2012.
(Continued)

*Primary Examiner* — Geoffrey S Evans
(74) *Attorney, Agent, or Firm* — Fish & Richardson P.C.

(57) ABSTRACT

The invention relates to a method for generating a three-dimensional component by selective laser melting, comprising: generating at least one process-influencing device by selective laser melting during generation of the three-dimensional component and activating the process-influencing device to act on an already completed area of the three-dimensional component prior to completion of the three-dimensional component. The invention also relates to a processing machine for carrying out the method.

16 Claims, 2 Drawing Sheets

(51) Int. Cl.
  *B22F 5/10* (2006.01)
  *B22F 7/06* (2006.01)
  *B23K 26/70* (2014.01)
  *B23K 103/04* (2006.01)
  *B23K 103/08* (2006.01)
  *B23K 103/10* (2006.01)
  *B23K 103/12* (2006.01)
  *B23K 103/14* (2006.01)
  *B33Y 10/00* (2015.01)
  *B33Y 30/00* (2015.01)
  *B22F 3/24* (2006.01)
  *B23K 103/18* (2006.01)

(52) U.S. Cl.
  CPC .............. *B22F 7/06* (2013.01); *B23K 26/702* (2015.10); *B22F 2003/1056* (2013.01); *B22F 2003/248* (2013.01); *B23K 2103/04* (2018.08); *B23K 2103/05* (2018.08); *B23K 2103/08* (2018.08); *B23K 2103/10* (2018.08); *B23K 2103/12* (2018.08); *B23K 2103/14* (2018.08); *B23K 2103/26* (2018.08); *B33Y 10/00* (2014.12); *B33Y 30/00* (2014.12); *Y02P 10/295* (2015.11)

(56) References Cited

U.S. PATENT DOCUMENTS

| | | |
|---|---|---|
| 8,974,727 B2 | 3/2015 | Abe et al. |
| 9,114,567 B2 | 8/2015 | Monsheimer et al. |
| 2002/0158054 A1 | 10/2002 | Manetsberger et al. |
| 2006/0118532 A1 | 6/2006 | Chung et al. |
| 2010/0151145 A1* | 6/2010 | Richter ................ B22F 3/1055 427/543 |
| 2013/0075575 A1* | 3/2013 | Abe ...................... B29C 35/0272 249/78 |
| 2013/0199013 A1* | 8/2013 | Graichen ................ B22F 9/24 29/402.09 |
| 2013/0309420 A1 | 11/2013 | Flesch et al. |
| 2014/0239553 A1* | 8/2014 | Bamberg .............. B22F 3/1055 264/460 |
| 2015/0064050 A1* | 3/2015 | Retze ................... B23K 26/342 419/53 |
| 2016/0052057 A1* | 2/2016 | Xu ....................... B23K 26/342 419/5 |
| 2016/0074965 A1* | 3/2016 | Jakimov ............... B23K 26/342 219/76.12 |

FOREIGN PATENT DOCUMENTS

| | | |
|---|---|---|
| CN | 101107882 A | 1/2008 |
| DE | 10319494 A1 | 11/2004 |
| EP | 2415552 A1 | 2/2012 |
| EP | 2581154 | 4/2013 |
| WO | WO2005069029 A1 | 7/2005 |
| WO | WO2012055398 A1 | 5/2012 |

OTHER PUBLICATIONS

International Search Report from corresponding PCT Application No. PCT/EP2014/001771, dated Feb. 25, 2015, 6 pages.

* cited by examiner

GENERATING A THREE-DIMENSIONAL COMPONENT BY SELECTIVE LASER MELTING

CROSS-REFERENCE TO RELATED APPLICATIONS

This application is a continuation of and claims priority under 35 U.S.C. § 120 to PCT Application No. PCT/EP2014/001771 filed on Jun. 27, 2014, which claimed priority to German Application No. DE 10 2013 212 620.4, filed on Jun. 28, 2013. The contents of both of these priority applications are hereby incorporated by reference in their entirety.

TECHNICAL FIELD

The present invention relates to generating a three-dimensional component by selective laser melting.

BACKGROUND

Selective laser melting (also referred to as SLM) is an additive manufacturing process in which a (metal) powder material is melted at defined positions by means of a laser. Selective laser melting enables components to be produced with almost any designable three-dimensional component geometry. In order to produce three-dimensional components, selective laser melting is usually carried out in layers, i.e. form-welding is carried out layer by layer. In this case, the material powder is initially distributed in a thin layer over a base plate. Once the material powder in this first layer of the powder bed has been remelted by the laser at the necessary positions, following the desired contour of the component being produced, and solidified to form a first solid material layer, the base plate is lowered or moved by the amount of the first layer and a new (second) layer is applied. Laser melting is repeated accordingly on this layer, wherein remelted material in what is currently the uppermost layer is connected to solid material disposed directly thereunder. The process described above is repeated until the component to be generated has been completely produced.

So that the completed component can be removed more easily, a comparatively filigree support structure can be built on the base plate or the substrate which supports the actual component. This structure may be manually removed, for example, following removal of the component. Depending on the geometry of the component being generated (in the case of overhangs, for example) further supports or supporting structures may also be generated, where necessary, and may be removed before the component is used.

In this case, laser melting takes place in a processing chamber which is typically hermetically sealed and in which the atmosphere is made as homogeneous as possible, wherein the laser required to melt the powder material enters the processing chamber through a processing chamber window. So that the laser beam is able to act on the powder material at the positions required for the desired component geometry, the laser beam is typically deflected by means of a scanner device.

Due to the continuous laser irradiation, selective heat conduction is required where appropriate, in order to avoid geometric deviations from the desired geometry and, in particular, to avoid solidification cracks caused by thermally induced internal stresses and to eliminate unwanted material structures, in particular, such as coarse grain, for example.

In order to manage or control these detrimental consequences, it is known in the art for the component to be heat-treated once it has been completed by laser melting. According to the disclosure in WO2012/055398 A1, for example, this heat treatment may take place in an external heating appliance (a furnace), into which the component is moved upon completion, or optionally in the processing chamber itself, once the residual, unmelted material powder has been removed.

EP 2 415 552 A1 also discloses the heating of the completed component to optimize the material properties thereof following the selective laser melting process. In this example, heating takes place by means of a heating coil which is produced using the component to be generated in the same selective laser melting process and which is therefore located together with the created component in the material powder. Once the material powder has been removed, the heating coil is connected to an electrical energy source in order to inject the heating power.

The heat management of the resulting component may also be indirectly affected, even during selective laser melting, by heating the base plate for example or introducing heat exchangers for cooling purposes in holding devices. A procedure of this kind is also disclosed in EP 2 415 552 A1, in which the component is supported or held by a holder which cools the workpiece at the point of contact, so that sensitive areas of the component are not exposed to excessively high temperatures.

With an additive manufacturing process in the form of selective electron beam melting (SEBM), in which the material powder is melted instead of a laser beam with the help of an electron beam, the heat conduction may be influenced by deflecting the electron beam in advance of and/or following the actual manufacturing process.

WO2012/055398 A1 further teaches a selective change in the composition of the material of the component produced by selective laser melting through the use of reactive gases in the processing chamber, wherein the change in composition is intended to bring about an increase in the thermal resistance of the component.

In the case of selective laser melting, however, the accessibility of the process zone during generation of the component and therefore the possibility of actively influencing the process locally, i.e. on site, is reduced as a matter of principle.

SUMMARY

Various embodiments of the invention disclosed herein provide a method and a processing machine for generating a three-dimensional component by selective laser melting, such that the quality of the component generated by means of the processing machine can be increased.

In one aspect, the invention features a method for generating a three-dimensional component by selective laser melting comprising the following steps: generating at least one process-influencing device by selective laser melting during generation of the three-dimensional component and also activating the process-influencing device to act on an already completed area of the component prior to completion of the three-dimensional component.

Since the process-influencing device is generated at the same time as the construction of the three-dimensional component and activated prior to completion of the component, a direct, in particular local, influencing of the generation of the three-dimensional component may advantageously take place. In this case, the process-influencing device is activated when it is still surrounded by powdered material, i.e. before the residual, unmelted material powder is removed from the processing chamber. In this way, the quality capability of the selective laser melting process and also the quality of the component generated by a process of this kind can be substantially increased. The method described here may, in particular, lead to the generation of process-influencing devices which influence the component being produced, depending on its individual geometric characteristics, in an adapted manner. The process-influencing devices are typically no longer required following completion of the component and are disposed of.

The process-influencing device may, for example, act thermally and/or chemically on an area of the component that has already been completed. If a completed area of the workpiece is acted upon thermally by means of the process-influencing device, in that a desired heat distribution or a particular heat conduction is produced in the completed area, for example, the formation of heat cracks, the distortion of the component, coarse-grain formation and/or the production of unwanted metal phases, etc. can be prevented or at least mitigated to a significant extent. Moreover, thermal action on the already completed area also means that heat expansion problems which can occur particularly in the area of a traditionally heated base plate of a processing machine for selective laser melting can be reduced. If, by means of the process-influencing device, a completed area is acted upon chemically, in that, for example, reactive gases are fed to the already completed area of the component, influence can be selectively exerted on the metallurgical properties of the component. In the case of both thermal and also chemical action, the quality of the laser melting method and also the quality of the three-dimensional component manufactured can also be improved or increased.

In the case of the method described here, the component and the process-influencing device are typically generated in one and the same processing chamber of a processing machine carrying out the laser melting by a laser or by a plurality of lasers working simultaneously. During the use of a single laser or a single laser beam which is deflected by means of a galvano scanner, the deflection speed which, as a matter of principle, is low may possibly have a detrimental effect. Options for increasing the deflection speed include, for example, laser arrays (within the meaning of a controllable matrix of lasers), polygon scanners or solid state scanners. The component and the process-influencing device are typically generated from the same material powder in this case. It is clear that upon completion of the three-dimensional component, a traditional finishing treatment can likewise be carried out by means of the process-influencing device.

In a preferred variant, the process-influencing device is connected during generation to a functional interface of a processing machine carrying out the laser melting. The process-influencing device generated inside the processing chamber of the processing machine can interact with a supply device usually disposed outside the processing chamber via the functional interface. The supply device is used to supply the process-influencing device with the means required to act on the area of the component that is already completed. According to this variant of the method, the process-influencing device is generated in a state connected to the functional interface, so that the process-influencing device can come into operation immediately following completion thereof and even during the (further) production of the actual component or product. It is not therefore necessary for the process-influencing device to be connected in an additional process step to the functional interface or to the supply device.

In a further preferred variant, the process-influencing device is connected to the functional interface during generation via a supply end and a discharge end, respectively. Consequently, a functional circuit can be created starting from the supply device via the functional interface and the supply end of the process-influencing device connected to the functional interface and also, furthermore, via the process-influencing device and the discharge end thereof connected to the functional interface back to the supply device. In this functional circuit, means for acting on the already completed area, which have been provided by the supply device, can propagate.

In a further variant, an electrical conductor is preferably generated as the process-influencing device, which conductor is in contact with the area of the component that is already complete or is spaced apart therefrom. By means of an electrical conductor which is in contact with the at least partially generated component at one or at a plurality—preferably at least two—positions, it is possible to heat the component or areas of the component which is not yet completely completed conductively by exposure of the electrical conductor to a flow of current. In this way, the component generation can be thermally influenced even before the component is complete. In this case, the electrical conductor can be exposed to current via the supply or discharge end thereof through a supply device in the form of a voltage-generating device, so that heating takes place in the area of the component through which current flows. The usually thin electrical conductor or conductors in this case represent(s) to a certain extent preferential routes for the electrical current or current paths in the metallic powder. The density of the electrical conductors and the electrical conductivity thereof is usually greater than the density and conductivity of the surrounding metallic powder.

In a preferred variant, the electrical conductor is generated in such a manner that it at least partially surrounds the area of the three-dimensional component already completed, forming an induction loop. If the process-influencing device encloses the three-dimensional component or the area that is already complete, the electrical conductor can be used to influence the process as an inductor or as an induction heating unit, in order to heat the component in the area that is already complete. In this case, the electrical conductor is usually exposed to a direct current applied in an alternating manner or an alternating current at a predetermined frequency through the supply device configured as a voltage-generating device, so that alternating currents are induced in the already completed area of the component surrounded by the electrical conductor, said currents resulting in inductive heating of the completed area of the component. Exposure of the electrical line or inductor to current is carried out according to the invention even before completion of the component (but in terms of timing, following the complete generation of the electrical conductor forming the process-influencing device which is required to generate the closed current circuit). In this way, the component may undergo selective heat treatment in the area already completed even during generation. Selective inductive heat treatment is particularly advantageous over traditional conductive heat influence, in which heat is conducted in a conductive manner from the heated base plate, possibly initially via comparatively filigree component sections forming a support structure, and then into the actual component. By contrast, a more uniform energy flow density can be achieved through inductive heat influence.

In order to prevent sintering of metal powder located between the component and the electrical conductor, the conductive electrical resistance selected in the electrical conductor is preferably smaller than the induced electrical resistance in the generated component. This can be achieved, particularly when using the same material for the component and for the electrical conductor, in that the material density and/or geometry, for example the conductor cross section, of the electrical conductor are suitably selected. In order to prevent unwanted heating of the electrical conductor/inductor conductor, the conductor cross section thereof may, for example be enlarged by comparison with the wall thickness of the metal component. For example, a metal component with a wall thickness of less than 1 mm in the metal powder bed heats up significantly more than the electrical conductor/inductor conductor with a diameter of 4 mm. Alternatively or in addition to adapting the geometry or increasing the conductor cross section, the electrical conductor may also be actively cooled by means of a liquid that is not, or only weakly, electrically conductive, which liquid is guided through a hollow space provided in the conductor, for example. It has been demonstrated that if there is a suitable choice of geometry, even a high intermittent current intensity of approx. 100 A through the electrical or metallic conductor has not resulted in the metal powder present between the component and the electrical conductor being sintered.

With the inductive injection of heat, the heat input into the completed area of the component is predominant, while the material powder is barely heated on account of the comparatively low bulk density and the low particle size. The electrical conductor is preferably of solid design, but it may optionally also have a hollow space (see above). It is evident that, for example, in order to influence a first completed area of the component, a first electrical conductor can be generated as a first process-influencing device and can be put into operation, in order to heat up the first area inductively, and that at the same time or afterwards for the influencing of a second completed area of the component, a second electrical conductor can be generated and put into operation as a second process-influencing device, in order to heat the second area inductively, wherein the heat input generated by the two electrical conductors in the component may be different.

In the simplest case, the electrical conductor or the inductor may be composed of a single winding or loop. Where there is a plurality of electrical conductors or a plurality of process-influencing devices, these windings or loops are typically independent from an electrical point of view. It is also possible in principle for helical electrical conductors which surround the completed area of the component to be generated, wherein in this case the putting into operation or activation of the process-influencing device takes a comparatively long time, as this can only take place when the upper end of the electrical conductor in the building direction has been generated.

In this variant of the method, a direct current applied in an alternating manner or an alternating current with a given predetermined current intensity and frequency is transported, as a means of influencing the already completed area of the component, in the function circuit created by the supply device, the functional interface and the electrical conductor. The electrical conductor or a pipeline (see below) may be connected during generation in this case to a functional interface in the form of preferably detachable through-hole contacts, for example. Through-hole contacts of this kind may be fed through openings or apertures in the processing chamber wall or the base plate and fastened, for example screwed, to and sealed on the processing chamber wall or the base plate.

The through-hole contacts may act as a functional interface or as a docking point for the process-influencing device, for example the electrical conductor or pipeline, and outwardly seal the processing chamber or the base plate. The through-hole contacts may form a contact to a supply device for the process-influencing device at the end facing away from the processing chamber. For example, a contact to an external current source may be created or a fluid-tight connection to a media source or media drain for a fluid (a liquid or a gas). The through-hole contacts may be electrically and/or thermally insulated against the processing chamber wall or the base plate. The through-hole contacts may also form a separate, insulated substrate plate to which a current is applied upon completion of the electrical conductor or inductor.

If the through-hole contacts are detachable, functional interfaces optimized for specific tasks (for electrical conduction or media conveyance) can be realized. If no through-hole contacts are required, the openings or apertures in the processing chamber wall and/or the base plate may be closed by suitable closures, e.g. by caps. The base plate or processing chamber wall may, for example, exhibit a plurality of apertures, e.g. in the form of a grid arrangement, to receive the through-hole contacts. Depending on the geometry of the component, suitably positioned apertures are selected, in order to attach through-hole contacts there which are required for the process-influencing device to be generated. Upon completion of the component and also following removal from the processing chamber, the through-hole contacts can be detached, cleaned and disposed of as necessary.

A variant is also preferable in which the material powder for generating the component and/or the process-influencing device is selected from the group comprising: stainless steel, tool steel, aluminum, aluminum alloys, titanium, titanium alloys, cobalt-chrome-molybdenum alloys, bronze alloys, stainless steel alloys, nickel-based alloys, copper alloys. These material powders allow high-grade results to be achieved regarding the material properties of the component produced by laser melting. Moreover, no electrical discharge advantageously occurs with these material powders if, according to the invention, even before the component is fully completed the process-influencing device configured as an electrical conductor or inductor is put into operation and the material powder is located in areas of the processing chamber which are disposed between individual sections of the electrical conductor or else between the conductor and the workpiece. With most of the materials suitable for selective laser melting, particularly aluminum or aluminum alloys, the electrical resistance of the material in powder form is greater by about one order of magnitude than the electrical resistance of the (solidified) material of the component or of the process-influencing device generated in the laser melting process, so that a putting into operation of the process-influencing device during generation of the component is also unproblematic from a safety point of view.

A variant is likewise preferable in which a pipeline for gaseous or liquid media is generated as the process-influencing device. A pipeline of this kind can be used to transport fluids, i.e. gaseous or liquid media, from the supply device to the already completed area of the component (and back where necessary), in order to selectively influence said area. The pipeline in this case is used as it were an extension, in order to bring the fluid into direct contact with the component at the area in question, so as to realize gradient materials, for example. Pipelines within the meaning of this application are also understood to mean pipelines in the form of hollow body structures which exhibit a lower density than the surrounding powder bed, in particular (filigree) porous structures, through which fluids can likewise be transported. Pipelines of this kind may, in principle, be enclosed by a tubular jacket or, where appropriate, have an open design in respect of the powder bed. For example, metal foams can be generated as pipelines which, as hollow body structures in the metal powder, represent a preferential transport route for a fluid.

A pipeline of this kind may also exhibit an open end and a gas emerging from said open end can be selectively used to generate a flow in the processing chamber which keeps the gaseous processing emissions produced by laser melting away from the area of influence of the laser and/or prevents processing emissions of this kind from becoming deposited on the processing chamber window. A laminar flow is typically produced during this. In this way, it is possible to prevent gaseous processing emissions from interacting in a detrimental manner with the laser beam carrying out the selective laser melting or from being deposited on the processing chamber window and having a negative effect on the processing outcome. In this way, the rupture strength of the processing chamber window can be increased and, for example, the use of cross-jets to remove emissions from the processing zone can also be dispensed with.

The pipelines may also be used alternatively or additionally as heating and/or cooling ducts to act thermally on the already completed area of the component and to achieve heat treatment or heat influence within the meaning described above. In this case, the pipeline is typically connected via a supply end of the pipeline and a discharge end of the pipeline to the functional interface, so that together with the supply device, a functional circuit is created in which the gaseous or liquid medium is transported. It is evident that the pipeline generated in the selective laser melting method is configured according to the intended application (cooling or heating) to have a gaseous or liquid medium flowing through it, i.e. the pipeline is structurally of adequately strong dimensions that it is able to withstand the pressure or temperature of the gaseous or liquid medium in each case.

With a further preferred variant, electrical conductors and/or the pipeline run horizontally in sections, i.e. the electrical conductor and/or the pipeline have at least one section running in a horizontal direction, which runs along at least one layer of the powder bed running horizontally, i.e. at right angles to the building direction. Two or possibly more sections running in a substantially vertical direction may join this section, in order to connect the conductor or the pipeline to a functional interface in the base plate. Alternatively, the conductor or else the pipeline as a whole may run in a horizontal direction, wherein in this case the functional interface for connecting to the supply mechanism is located at the same height as the conductor or the pipeline. In this variant, the electrical line or the pipeline may be generated through the application of a comparatively small number of material powder layers processed by laser melting.

In a further preferred variant, the pipeline is configured integrally with the already completed area of the three-dimensional component during generation, wherein a hollow space in the pipeline ends on an outside of the completed area and/or an inside of the pipeline and an outside of the completed area of the component form a hollow space in the pipeline. In this way, reactive gases or liquids which influence the metallurgical properties of the component or the component material may be transported to the already completed area of the component, for example. If the hollow space of the pipeline ends at the outside of the completed area, the reactive gas or the reactive liquid supplied via the pipeline can have a selective local influence on the completed area. On the other hand, if the inside of the pipeline and a section on the outside of the completed area forms the hollow space in the pipeline, larger sections of the completed area are usually in contact with the medium passing or flowing through the pipeline and reactively and/or thermally influenced. It is clear that the pipeline according to this variant of the method can also be used for direct cooling or heating by convection on the corresponding outside of the completed area. The connection of the pipeline to the component is preferably made via comparatively thin connecting points which, upon completion of the component, ideally allow the pipeline to be detached manually, i.e. without the help of a tool.

Another preferred variant is one in which the geometric shape of the process-influencing device is adapted to the geometry of the already completed area of the component. When there is both an inductive, conductive and also convective influence particularly when adjusting temperature, i.e. when heating or cooling, efficiency can be significantly improved by adapting the process-influencing device geometrically to the completed area. An adjustment of this kind, when the process-influencing device is configured as an electrical conductor, for example, and the component has a circular cross section, for example, can be achieved in that the electrical conductor surrounds the already completed area of the three-dimensional component in a circular manner. Particularly preferably, the process-influencing device in this case is generated spaced apart from the already completed area of the component, particularly at a distance of several millimeters. The penetration depth of the induction field depends on the frequency of the induction field and may therefore be varied or influenced within given limits. The process-influencing device or, more precisely, the electrical conductor, is preferably generated at the smallest possible distance from the already completed area of the component, as in this case, in addition to the inductive heating, indirect conductive heating can also be effected over the surrounding metal powder.

The problem is also solved by a processing machine of the kind referred to above characterized by at least one functional interface which extends into the processing chamber and can be connected to a process-influencing device for acting on an already completed area of the component during selective laser melting and also by a supply device for the process-influencing device which is connected to the functional interface. The functional interface extends into the processing chamber, i.e. it opens out into the processing chamber, and it may in particular project into the processing chamber, in order to make the connection to the process-influencing device.

The processing machine has the advantages described further above in connection with the method according to the invention. The supply device in this case provides the means necessary to act on the already completed area, such as gaseous or liquid media or electrical currents, for example. By means of the functional interface and the process-influencing device, these means can be transported from outside the processing chamber into the area of influence (to the already completed area of the component) located within the processing chamber, so that said means can take effect (thermally, chemically, etc.).

In a preferred embodiment of the processing machine, the functional interface is formed at a base plate for the layer-by-layer generation of the three-dimensional component. In order to achieve the most uniform layered distribution possible of the material powder required for laser melting, the base plate is typically aligned horizontally and during the course of the selective laser melting it is moved down vertically (in the building direction) by the height of a layer thickness in each case. If the functional interface is formed on the base plate, during the gradual movement of the base plate, the functional interface and the process-influencing device connected to the functional interface or attached thereto and also the material powder and the already completed area of the component are moved together. A relative movement to other parts of the processing machine takes place exclusively at the interfaces between the base plate and a fixed frame of the processing machine, for example. It is clear the one or several functional interfaces can also be attached at another point in the processing machine, for example to a side wall of the processing chamber.

In a further preferred embodiment, the supply device is configured as a voltage producing device which can be connected via the functional interface to a supply end and a discharge end of the process-influencing device configured as an electrical conductor. The voltage-generating device enables the current required for the inductive heat generation described above in the completed areas of the component to be generated as a direct current applied in an alternating manner or as alternating current, for example, in that a suitable voltage and a desired polarity or frequency are provided to produce the current at a desired current intensity.

In addition, an embodiment in which the supply device is configured as a feeding device for gaseous or liquid media which can be connected to a process-influencing device configured as a pipeline is preferred. The feeding device enables the gaseous and/or liquid media required for the conductive and/or chemical action described above on the completed areas of the component to be provided at a desired temperature and a desired pressure.

Further advantages of the invention emerge from the description and the drawing. Likewise, the aforementioned features and those set out below may be applied alone or together in any combinations. The embodiments shown and described should not be understood to represent an exhaustive list, but instead they are exemplary in character and intended to describe the invention.

DESCRIPTION OF DRAWINGS

In the following description of the drawings, identical reference numbers are used for identical components or those with identical functions.

DETAILED DESCRIPTION

Figure 1:
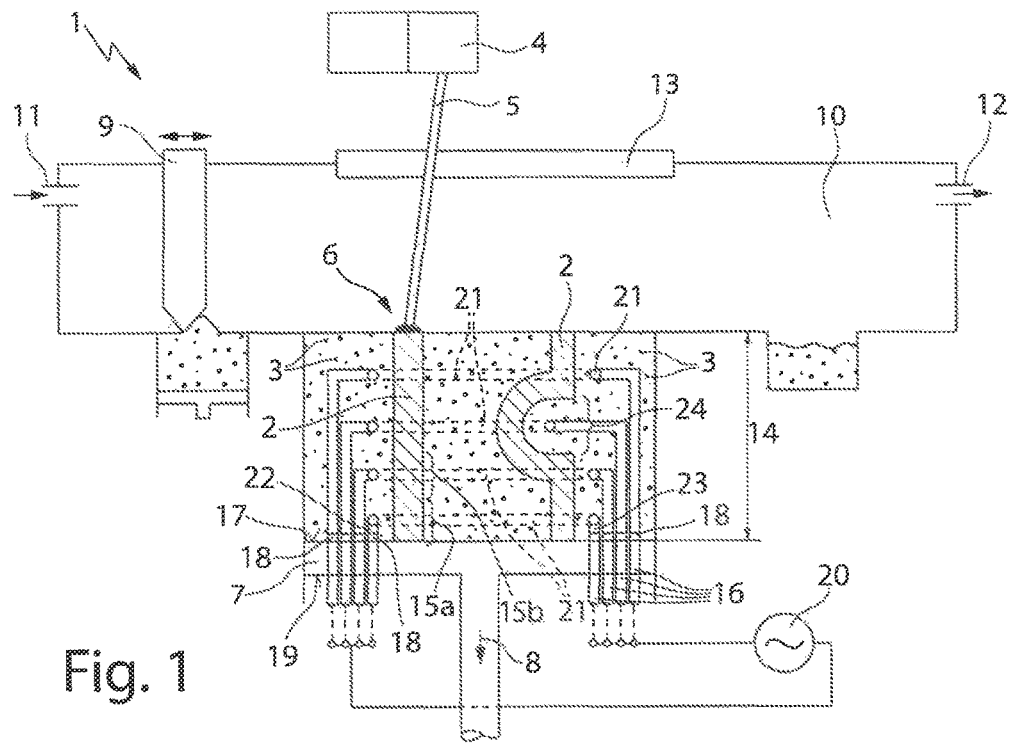
FIG. 1 shows a cross section of an exemplary embodiment of a processing machine for generating a component by selective laser melting, in which the process-influencing devices configured as electrical conductors or inductors have been generated and activated through selective laser melting.

FIG. 1 shows a processing machine 1 for generating a three-dimensional component 2 depicted in cross section by means of selective laser melting. Selective laser melting involves a material powder 3 being remelted in layers by means of a laser beam 5 selectively deflected via a scanner device 4 at positions 6 provided according to the desired component geometry of a powder bed 3 formed by the material powder 3. Once the laser melting process has been carried out in a first material powder layer and the material powder 3 has solidified at the corresponding positions 6, the base plate 7 on which the first layer was generated is lowered by the amount of the first layer thickness in the direction of gravity 8, i.e. downwards, and a second material powder layer is applied over the first layer by means of a slide 9. The selective laser melting is then repeated until the three-dimensional component 2 is completely generated. In order to prevent process gases produced during the formation of the component 2 from reacting with the laser beam 5, protective gases such as argon or nitrogen, for example, are introduced into a processing chamber 10 via a supply line 11 and a discharge line 12. In the configuration shown in FIG. 1 of the supply line 11 and the discharge line 12, a flow of the protective gas is produced parallel to a processing chamber window 13, through which the laser beam 5 required in order to melt the material powder 3 enters the processing chamber 10. In this way, contamination of the processing chamber window 13 by deposits of the process gas should be avoided.

In order to fully complete the three-dimensional component 2 shown in FIG. 1 by means of selective laser melting, a plurality of layer-by-layer laser melting processes is required. Individual layers are typically several millimeters thick, which means that depending on the component height 14 of the component 2 to be generated, between the start of the laser melting and full completion of the component 2, up to several thousand layer-by-layer melting processes may be necessary, for example. Before the component 2 is fully completed, already completed areas 15a, 15b of the component 2 exist which typically comprise a plurality of remelted and solidified individual layers.

The processing machine 1 has a plurality of functional interfaces 16 which are each configured on the movable base plate 7. The functional interfaces 16 in the example shown have connection pieces 18 which are formed on the upper side 17 of the base plate 7 and project into the processing chamber 10. On the opposite side (the underside 19 of the base plate 7), the rod-shaped functional interfaces 16 in the example shown are connected to a supply device configured as a voltage-generating device 20.

During generation of the three-dimensional component 2, but still prior to completion thereof, process-influencing devices configured as electrical conductors 21 are generated by selective laser melting in the processing chamber 10, by means of which devices an already completed area 15a, 15b of the component can be acted upon thermally by electrical induction. For this purpose, the electrical conductors 21 are put into operation or activated with the help of the voltage-generating device 20 before the component 2 is completed, i.e. while the electrical conductors 21 are embedded in the powder bed. When the areas 15a, 15b of the component 2 and of the electrical conductor 21 are generated simultaneously, one and the same laser beam 5 is used.

In FIG. 1 the voltage-generating device 20 is connected via, among other things, a first functional interface 16 (the innermost radially in respect of the component 2) which has a first and a second connector 18 to a supply end 22 and a discharge end 23 of the first (lowermost) electrical line 21. By putting the voltage-generating device 20 into operation, the electrical line 21 may be exposed to a direct current applied in an alternating manner or an alternating current with a predetermined frequency and current intensity, for example, as a result of which alternating currents can be induced in FIG. 1 in the first lower area 15a completed at a first point in time, which alternating currents heat up the component 2 locally in this area 15a. It is clear that depending on the level of the current intensity (or the voltage associated with this), the frequency and/or the material powder used, the intensity of the heating effect on the already completed area 15a can be varied. Since at the same time, for further generation of the three-dimensional component 2, the other electrical lines 21 (or process-influencing devices) are generated, directly following completion of the last electrical line 21 in each case, said line can be brought into operation in addition by the voltage-generating device 20 and a further completed area of the component 2 can therefore be acted upon thermally, as shown in FIG. 1, for example, for the further completed area 15b which is heated by the second electrical line 21 (viewed from the base plate 7). As a result of the direct, local thermal influence on the completed areas 15a, 15b, which takes place during generation of the component 2, the quality of the generated component 2 can be substantially improved. For example, a deviation of the generated component 2 from the desired geometry on account of thermal influences, particularly on account of thermally induced residual stresses, can be selectively counteracted.

The electrical lines 21 in FIG. 1 each exhibit a portion extending in a (substantially) horizontal direction which is spaced apart from the corresponding area 15a, 15b that has already been completed. In this case, they surround, particularly in a circular or helical manner, the three-dimensional component 2 of cylindrical configuration depicted in cross section in FIG. 1 and the completed area 15a, 15b in each case. The vertical supply end 22 and the discharge end 23 which form the electrical contact with the voltage-generating device 20 join the portion of the electrical conductor 21 running in a substantially horizontal direction. It is clear that due to the use of alternating current or direct current generated in an alternating manner, the distinction between the supply end 22 and the discharge end 23 in the exemplary embodiment described in connection with FIG. 1 is not entirely appropriate.

The adjustment of the electrical conductors 21, at least in the section running in a horizontal direction, to the geometric shape of the areas 15a, 15b (circular conductors 21 to component areas 15a, 15b likewise circular in cross section) furthermore exists in the area of an indented portion 24 of the component 2, in which the diameter of the ring-shaped circumferential section of the third electrical line 21, viewed from the base plate 7, is smaller, in order to guarantee great effectiveness of the inductive heating effect, even in the region of the indented portion 24. It has proved beneficial for the diameter of the electrical conductor 21 to be greater than the thickness of the generated component 2, as in this way the component 2 is heated more intensely than the induction conductor 21. In this way, the component 2 can be heated to temperatures of up to 1000° C. and thereby melted locally where necessary, without the electrical conductor 21 itself being heated too intensely and therefore deformed. The fact that during the heating of the electrical conductor 21 heat is delivered indirectly to the component 2 via the metallic powder 3 advantageously assists with this.

As an alternative or in addition to the generation of electrical conductors 21 which are spaced apart from the component 2, the component 2 may, where necessary, be brought into direct contact at individual positions or areas with a plurality of (thin) electrical conductors which are generated in the manner described above, in order to expose the component 2 to current directly and heat it up conductively. The electrical currents exhibit a greater density and therefore also a greater conductivity than the surrounding powdered material 3 and serve to create current paths in the powdered material 3.

Figure 2:
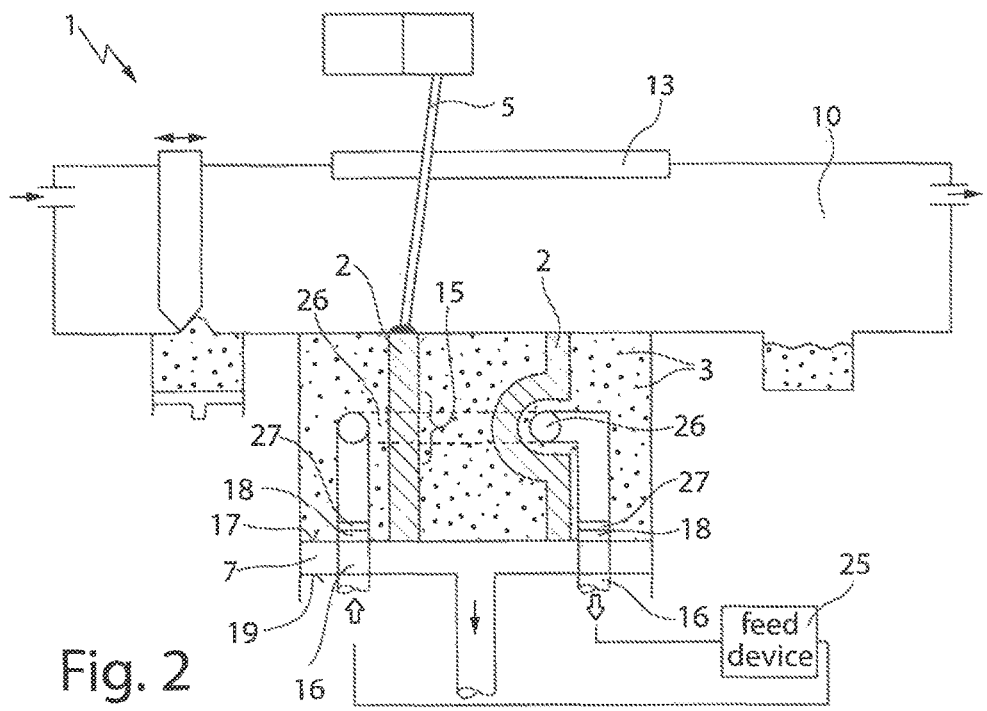
FIG. 2 shows a representation of a processing machine as in FIG. 1 with a process-influencing device in the form of a pipeline which was generated by selective laser melting.

FIG. 2 shows a processing machine 1 which comprises a supply device configured as a feed device 25 for gaseous or liquid media. In the depiction shown in FIG. 2, the three-dimensional component 2 has already been completely generated. On the base plate 7, the processing machine 1 has a functional interface 16 which projects on the upper side 17 of the base plate 7 via a first and second connection piece 18 into the processing chamber 10 and which is connected on the underside 19 of the base plate 7 to the feed device 25.

Selective laser melting makes it possible for a process-influencing device configured as a pipeline 26 to be generated in the processing chamber 10 during generation of the three-dimensional component 2, in other words even before the entire component 2 has been completed, by means of which process-influencing device thermal influence can be exerted on an already completed area 15 of the component 2. The pipeline 26 in this case is typically generated in a state connected at one end to the first connection piece 18 and at the other end to the second connection piece 18, wherein attachments 27 are mounted on the respective connection piece 18 to connect to the pipeline 26, which attachments may be in the form of detachable plug-in attachments of the functional interface 16, for example. For the thermal influence to be exerted on the completed area 15, the feed device 25 is put into operation before completion of the three-dimensional component 2 and a gaseous or liquid cooling or heating medium is transported in the functional circuit formed by the feed device 25, the functional interface 16 and the pipeline 26, in order to realize a heat exchanger. In this way, by means of selective heat conduction, the formation of heating cracks, distortion, production of unwanted metallic phases, etc. can be counteracted in the areas 15 of the component 2 which are already completed.

In accordance with FIG. 1, the pipeline 26 in FIG. 2 is also generated (in a circular manner) using a section extending horizontally and a form adapted to the geometry of the area 15 of the component 2 already completed. The pipeline 26 is not necessarily configured as a (substantially cylindrical) jacket with a hollow space; hollow body structures in the form of (filigree) porous structures, for example, in the manner of metal foams can also be generated, which metal foams are surrounded by a (solid) jacket, where necessary. As a general rule, structures which represent preferential routes for the media (fluids, current) in the powder bed 3 are advantageous as process-influencing devices, i.e. they either exhibit a greater density than the powder or the powder bed 3 (current) or, conversely, a lower density than the surrounding powder bed 3, in order to create hollow body structures for the transportation of fluids.

Figure 3:
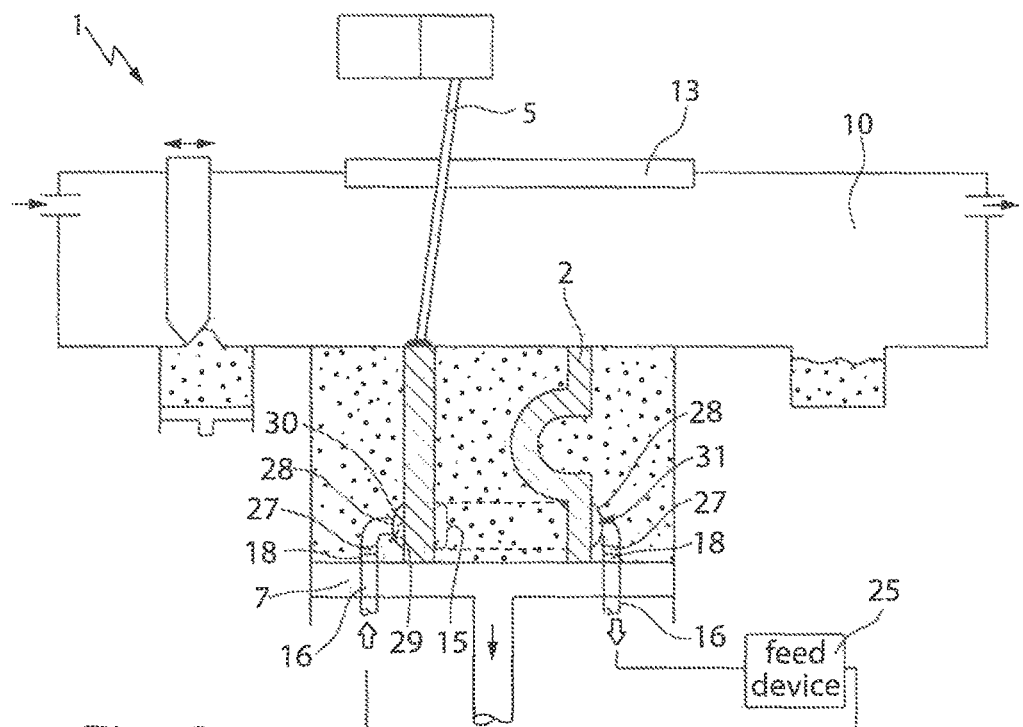
FIG. 3 shows a representation of a processing machine as in FIG. 1 with a process-influencing device in the form of a pipeline integrally connected the component and FIG. 4 shows a representation of a processing machine as in FIG. 1 with a process-influencing device configured as a pipeline for selective gas supply into the processing chamber.

A further processing machine 1 is depicted in FIG. 3, the functional interface 16 whereof formed on the base plate 17 exhibits a first and a second connection piece 18 projecting into the processing chamber 10. The example shown in FIG. 3 substantially differs from the example described in connection with FIG. 2, in that through selective laser melting a pipeline 28 has been generated as a process-influencing device which is configured integrally with the corresponding area 15 of the component 2 already completed, wherein an inside 29 of the pipeline 28 and an outside 30 of the completed area 15 form a circumferential hollow space 31 in the pipeline 28. The pipeline 28 is connected to the functional interface 16 via attachments 27 which prevent the powdered material 3 from passing through during generation of the pipeline 28. The attachments 27 (e.g. in the form of plastic plates) may be opened before the pipeline 28 is activated, e.g. in that said attachments are penetrated before the gaseous and liquid media are transported through the pipeline 28 for the direct conductive cooling or heating of the completed area 15.

For the chemical action on the completed area 15, a reactive gas or a reactive liquid may be transported, for example, through the functional circuit created from the feed device 25, the functional interface 16 and the pipeline 28, so that on account of a chemical reaction taking place on the surface or the outside 30 of the completed area 15, a desired metallurgical property of the component 2 results. In this way, the quality of the three-dimensional component 2 produced can be improved.

Figure 4:
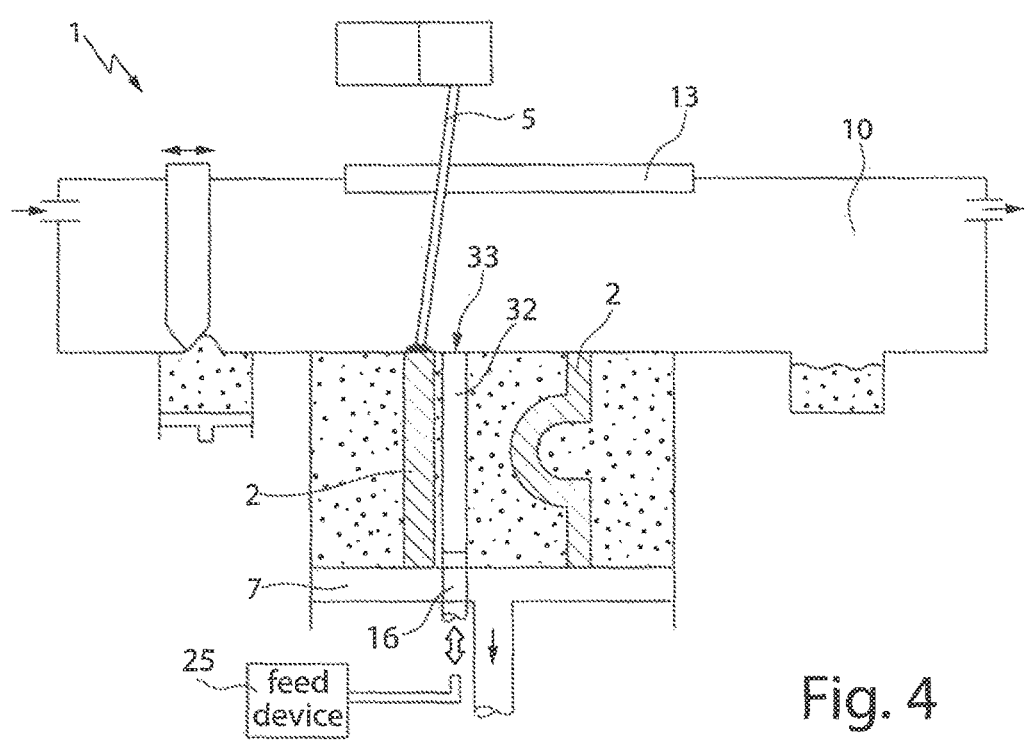

Finally, FIG. 4 depicts a further example of a processing machine 1 with a further functional interface 16 disposed on the base plate 7 in which, according to the teaching described above, a pipeline 32 connected at one end to the functional interface 16 was generated simultaneously with the generation of the component 2, the other end of said pipeline being open towards the processing chamber 10. By means of the feed device 25 and the pipeline 32, a usually inert auxiliary gas can be conducted through the open end 33 of the pipeline 32 into the processing chamber 10 and generate a flow there with a required flow profile. In this case, a flow can in particular be produced which keeps gaseous process emissions away from the area of influence of the laser beam 5 by laser melting and/or prevents a deposition of process emissions of this kind at the processing chamber window 13, as a result of which the quality of the laser melting method and also the component 2 produced therewith and, where appropriate, the service life of the processing chamber window, can likewise be improved.

In FIG. 1 to FIG. 4, different process-influencing devices 21; 26; 28; 32 were generated in the processing chamber 10 in each case. It is clear, however, that the base plate 7 of the processing machine 1 may also exhibit any combination of differently configured functional interfaces 16 or different supply devices 20; 25 in each case, so that in one and the same processing chamber 10, any combination of process-influencing devices 21; 26; 28; 32 may be produced and put into operation at the same time as the generation of the component. It is also not essential for the functional interfaces 16 to be disposed on the base plate 7; instead, they may be applied to a (vertical) side wall of the processing chamber 10, for example, in the area of the powder bed.

Different materials can be used as the material powder 3 for generating the component 2 and the process-influencing devices 21; 26; 28; 32, which are chosen from the group comprising stainless steel, tool steel, aluminum, aluminum alloys, titanium, titanium alloys, chrome-cobalt-molybdenum alloys, bronze alloys, stainless steel alloys, nickel-based alloys, copper alloys, for example.

In the manner described above, a direct and local influence may be exerted on the selective laser melting process, for example, in that local, demand-based heat conduction is made possible. Problems arising due to a smaller heat expansion of the component 2 in the environment of the base plate 7 in respect of the area in which the melt is formed, are mitigated by selective heat conduction to the component. In addition, the heat losses compared with a conductive heat injection can be lowered by an inductive heat injection into the component 2, as depicted in connection with FIG. 1, since on account of the comparatively low bulk density and small particle size the powdered material 3 is only heated slightly during inductive heating.

A number of embodiments of the invention have been described. Nevertheless, it will be understood that various modifications may be made without departing from the spirit and scope of the invention. Accordingly, other embodiments are within the scope of the following claims.

What is claimed is:

1. A method of generating a three-dimensional component by selective laser melting, the method comprising:
generating at least one electrical conductor, by selective laser melting during generation of the three-dimensional component; and
activating the at least one electrical conductor by exposing the at least one electrical conductor to an electric current flow to act on an already completed area of the three-dimensional component prior to completion of the three-dimensional component.

2. The method according to claim 1, wherein generating the at least one electrical conductor comprises connecting the at least one electrical conductor to a functional interface of a processing machine carrying out the laser melting.

3. The method according to claim 2, wherein the at least one electrical conductor is connected to the functional interface via a supply end and a discharge end in each case.

4. The method according to claim 1, wherein the at least one electrical conductor at least partially surrounds the already completed area of the three-dimensional component.

5. The method according to claim 1, further comprising generating at least one of the three-dimensional component and the at least one electrical conductor from a material powder selected from the group comprising: stainless steel, tool steel, aluminum, aluminum alloys, titanium, titanium alloys, chrome-cobalt-molybdenum alloys, bronze alloys, stainless steel alloys, nickel-based alloys, copper alloys.

6. The method according to claim 1, wherein generating the at least one electrical conductor comprises generating a pipeline for gaseous and/or liquid media.

7. The method according to claim 6, wherein the pipeline runs horizontally at least in sections.

8. The method according to claim 6, wherein generating the pipeline includes generating the pipeline in an integral configuration with the already completed area of the three-dimensional component and terminating an end of a hollow space in the pipeline on an outside portion of the completed area.

9. The method according to claim 6, wherein generating the pipeline includes generating the pipeline in an integral configuration with the already completed area of the three-dimensional component and forming a hollow space in the pipeline with an inside of the pipeline and an outside portion of the completed area.

10. The method according to claim 6, wherein a geometric shape of the pipeline is adapted to a geometry of the already completed area of the three-dimensional component.

11. The method according to claim 1, wherein the at least one electrical conductor runs horizontally at least in sections.

12. The method according to claim 1, wherein a geometric shape of the electrical conductor is adapted to a geometry of the already completed area of the three-dimensional component.

13. The method according to claim 1, wherein the at least one electrical conductor is spaced apart from the already completed area of the three-dimensional component.

14. The according to claim 1, wherein generating the at least one electrical conductor comprises generating the at least one electrical conductor as a solid conductor component.

15. A processing machine for generating a three-dimensional component by selective laser melting comprising:

a processing chamber, at least one functional interface which extends into the processing chamber and is configured to be connected to an electrical conductor for acting on an already completed area of the three-dimensional component during selective laser melting, the at least one functional interface configured to be connected to a supply device for the conductor, which is connected to the at least one functional interface; wherein the supply device is configured as a voltage generator configured to be connected via the functional interface to a supply end and a discharge end of the conductor.

16. The processing machine according to claim 15, wherein the functional interface is configured at a base plate for layer-by-layer generation of the three-dimensional component.

* * * * *